April 8, 1969 L. MALAKOFF 3,437,932

FSK RECEIVER WHEREIN ONE BINARY SIGNAL IS REPRESENTED BY A HALF CYCLE OF A GIVEN FREQUENCY AND THE OTHER BINARY SIGNAL IS REPRESENTED BY A FULL CYCLE OF TWICE THAT FREQUENCY

Original Filed Jan. 13, 1964 Sheet 1 of 3

INVENTOR.
LOUIS MALAKOFF

BY Moody and Phillion
ATTORNEYS

INVENTOR.
LOUIS MALAKOFF

BY Donald W. [signature]

ATTORNEY

FSK RECEIVER WHEREIN ONE BINARY SIGNAL IS REPRESENTED BY A HALF CYCLE OF A GIVEN FREQUENCY AND THE OTHER BINARY SIGNAL IS REPRESENTED BY A FULL CYCLE OF TWICE THAT FREQUENCY

Original Filed Jan. 13, 1964

INVENTOR.
LOUIS MALAKOFF
BY Donald W. Rullison
ATTORNEY

United States Patent Office 3,437,932
Patented Apr. 8, 1969

3,437,932

FSK RECEIVER WHEREIN ONE BINARY SIGNAL IS REPRESENTED BY A HALF CYCLE OF A GIVEN FREQUENCY AND THE OTHER BINARY SIGNAL IS REPRESENTED BY A FULL CYCLE OF TWICE THAT FREQUENCY

Louis Malakoff, Huntington Beach, Calif., assignor to Collins Radio Company, Cedar Rapids, Iowa, a corporation of Iowa Continuation of application Ser. No. 337,480, Jan. 13, 1964. This application Oct. 30, 1967, Ser. No. 700,660
Int. Cl. H04b *1/16*
U.S. Cl. 325—320 5 Claims

ABSTRACT OF THE DISCLOSURE

Means for demodulating a time synchronous data carrying received signal consisting of half cycles of frequency $f_1$ representing "0's" and full cycles of frequency $2f_1$ representing "1's" with the peak amplitudes of both frequencies being equal and with bit transitions occurring at the peak amplitudes of the half and full cycles. The zero crossings are detected to produce a two-level signal which changes level at each zero crossing. A change in polarity from one bit transition period to the next determines the data stored therein and is detected by sampling the two-level signal at the bit transition time. The use of frequencies $f_1$ and $2f_1$ enables the derivation of the sampling pulses from the zero crossings of the received signal. Appropriate shift register means compare the samplings of adjacent bit transition times.

This application is a continuation-in-whole of United States Patent application Ser. No. 337,480, filed Jan. 13, 1964 by Louis Malakoff, now abandoned, entitled "Demodulator Using Zero Crossings Received Single Tone Data Signal and assigned to the Collins Radio Company, a corporation of Iowa.

This invention relates generally to means for receiving time synchronous signals of the type known as frequency shift keyed signals (FSK) wherein a half cycle of a first signal frequency represents either a mark or a space, and a full cycle of a second signal whose frequency is twice that of said first frequency represents the other binary bit.

One means for communicating binary information is to convert the binary information, perhaps originally a two-level signal, into a single tone signal in which one of the bits, for example the space is represented by a half cycle of a given frequency, and the mark by a full cycle of a signal having twice the frequency of the first signal. The ends and the beginnings of the half and full cycles occur at the peak amplitudes thereof. Since the peak amplitudes of both the first and the second frequency signals are the same, such a coding arrangement results in a smooth transition from a mark to a space. More specifically, in the case of a space the half cycle might begin at a negative peak condiiton and terminate at the positive peak amplitude so that the next bit, assumed to be a mark, will begin at the positive peak of its full cycle and terminate at the positive peak. The next bit, which can be either a mark or a space, will then begin at the positive peak of the half or full cycle representing the data bit. Data encoded in such a manner is time synchronous in that all bits occupy equal time intervals which occur consecutively.

One means for receiving such a signal is disclosed in copending application Ser. No. 150,786, filed Nov. 7, 1961, now U.S. Patent No. 3,146,307, by K. H. Renshaw, and entitled "Single Tone Data Receiver" which application is incorporated herein by reference. In said copending application the received single tone data signal is passed through a balanced discriminator to produce a two-level signal, the polarity of said output signal being indicative of the first or the second frequency making up the received single tone signal. A synchronizing signal is derived from the received data signal and employed to produce a sampling signal which samples the output of the discriminator once during each bit interval. The sampled outputs from the discriminator have a polarity which is indicative of either a mark or a space. Such sample pulses are then processed in accordance with their polarity to produce a two-level binary signal representing the data contained in the received single tone data signal.

While the aforementioned prior art functions well, it does involve considerable circuitry in that several limiting stages are required prior to the signal being supplied to the balanced discriminator to assure proper discriminator action. Further, the balanced discriminator itself constitutes a circuit which is not needed in the present invention.

A principal object of the invention is to provide a simplified receiving means for receiving a single tone data signal of the type described herein.

A second object of the invention is a means for demodulating a single tone data signal in which the balanced discriminator circuit and the limiting stages preceding said limiter circuit are not needed.

A third aim of the invention is a relatively inexpensive and reliable receiver for demodulating a single tone data signal.

In accordance with the invention there is provided a means for receiving the signal and a means for detecting the zero crossings of the received data tone signal, and for producing from said zero crossing determination a two-level signal which changes level at each zero crossing. Inverter means function to produce a second two-level signal which is the inverted form of the first two-level signal. Other means are provided for deriving synchronized gating pulses from the received data signal, which gating pulses occur substantially at the end of each bit period and, in essence, functions to determine whether there has been a polarity change during the bit period. A polarity change indicates a half cycle data bit which represents a space; no polarity change indicates a full cycle, which represents a mark.

Other circuit means, including a first flip-flop means, is responsive to both of the two-level signals and also the gating pulse to become set or reset depending upon the polarities of the two two-level signals. If a series of marks occur, for example, with each mark being represented by full cycle, there will be no change of polarity at the end of each bit, so the flip-flop circuit will remain in whatever state it was in prior to receiving the mark, which state can be either the set or the reset state. A space, however, which is represented by a half cycle, produces a change of polarity at the end of the bit so that the condition of the flip-flop will be changed from whatever state it was in to its other state. Thus, a change of state of the flip-flop circuit indicates the reception of a space and the maintenance of the status quo of the flip-flop indicates the reception of a mark. Second flip-flop means are provided to respond to the output signals of the set and reset outputs of the first flip-flop means at the occurrence of the next occurring gating pulse. Thus, the condition of the second flip-flop means will follow the condition of said first flip-flop means, but always one bit period therebehind.

Exclusive OR means function to respond to the outputs of the first and second flip-flop means to produce a two-level binary signal containing the data of the received single tone data signal. More specifically, the exclusive OR means responds to output signals of corresponding output terminals of the two flip-flop means, i.e., either the set or the reset output terminals. Since the state of the second flip-flop circuit follows the state of the other flip-flop by one bit, a change of polarity of said first flip-flop will not occur in said second flip-flop until one bit period later. Therefore, if the output signals of the corresponding output terminals of the two flip-flop circuits are at different levels, the indication is that a space has just been received. If the levels of the corresponding outputs of the flip-flop circuits are the same, the conclusion is that no change in state of the first flip-flop occurred, thus indicating the reception of a mark.

The above-mentioned and other objects and features of the invention will be more fully understood from the following detailed description thereof when read in conjunction with the drawings in which.

Figure 1:
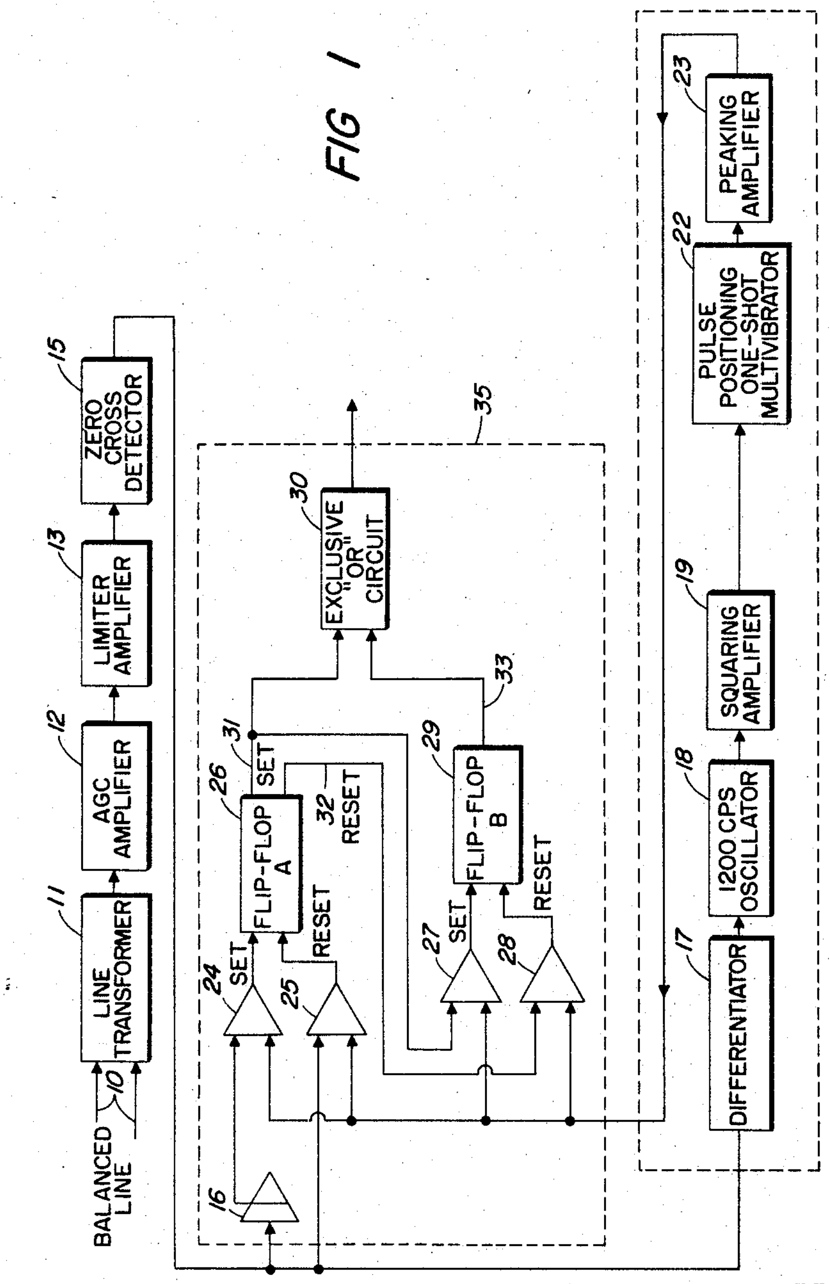
FIG. 1 is a block diagram of the invention.

Referring now to FIG. 1, the transmitted single tone data signal shown in FIG. 2*a* is received on the balanced line 10 and supplied to line transformer 11, the output of which is, in turn, supplied to amplifier 12. Limiter amplifier 14 is provided to amplify the signal to a suitable level before being supplied to the zero-cross detector 15. For purposes of discussion, assume the received data signal consists of 1200 c.p.s. and 600 c.p.s. signals with whole cycles of the 1200 c.p.s. signal representing a mark and a half cycle of the 600 c.p.s. signal representing a space.

Figure 2:
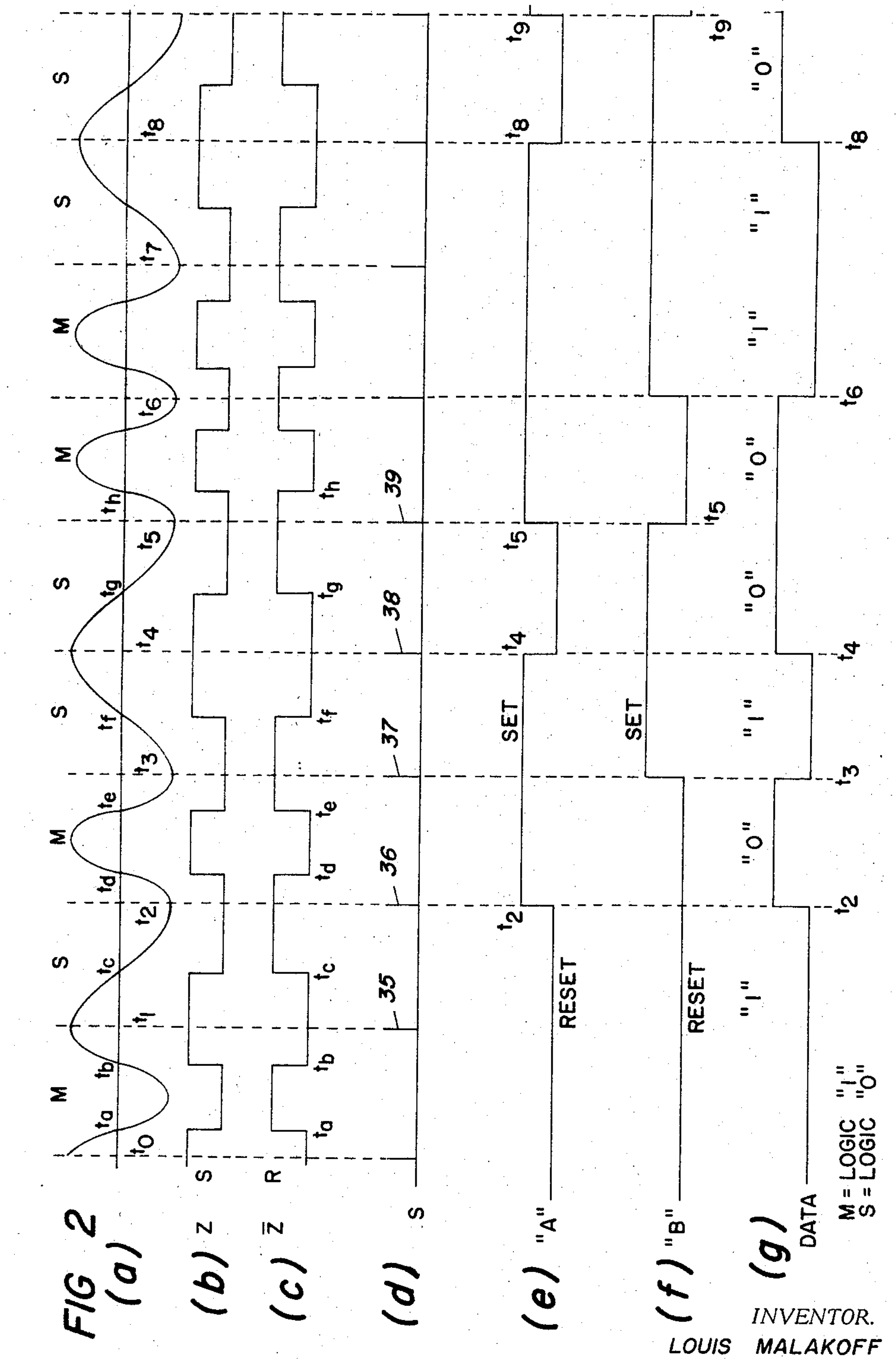
FIG. 2 is a set of waveforms illustrating the operation of the invention.
Figure 3:
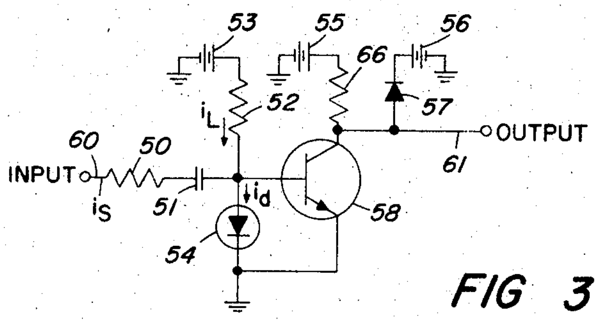
FIG. 3 is a circuit diagram of the zero-cross detector circuit.

Zero-cross detector 15, shown in detail in FIG. 3, functions generally to produce a two-level signal with the levels changing at each zero crossing of the received data tone signal. FIG. 2*b* shows the two-level signal produced at the output of zero-cross detector 15. It will be observed that the level shifts at each zero crossing of the received data tone signal of FIG. 2*a*.

The output of the zero-cross detector 15 is supplied generally to two different circuits. One such circuit consists of means for generating the gating pulses of FIG. 2*d* and is comprised of differentiator 17, 1200 c.p.s. oscillator 18, squaring amplifier 19, pulse positioning one-shot multivibrator 22, and peaking amplifier 23.

The second circuit to which the output of zero-cross detector circuit 15 supplies a signal is designated generally by the dotted block 35 and is comprised of inverter 16, AND gates 24, 25, 27, and 28, flip-flop circuits 26 and 29, and exclusive OR circuit 30. The AND gates, the flip-flop circuits, and the OR circuit within the dotted block 35 will be discussed in connection with the curves of FIG. 2 later herein.

First, however, the means for producing the gating pulses of FIG. 2*c* will be discussed. More specifically, the output of the zero-cross detector 15 is differentiated by differentiator 17 to produce a series of narrow pulses which have a 1200 c.p.s. component therein. Such 1200 c.p.s. component will drive the oscillator 18 at a frequency of 1200 c.p.s. and with a phase which is fixed relative to the bit interval of the received data tone signal. For a more detailed discussion of the oscillator 18, reference is made to the aforementioned copending application Ser. No. 150,786.

The output of oscillator 18 is supplied to a squaring amplifier 19 and thence to a pulse positioning one-shot multivibrator 22 which functions to produce output pulses having the proper time relationship to the bit intervals. Referring now to FIG. 2*d*, the pulses shown therein represent the output of pulse positioning one-shot multivibrator 22 after passing through peaking amplifier 23. For purposes of discussion, however, it can be assumed that the pulses of FIG. 2*d* represent the output of multivibrator 22.

It will be noted that the pulses of FIG. 2*d* occur at the end of each bit period and during the stable conditions of the two-level signals of FIGS. 2*b* and 2*c* which represent, respectively, the noninverted and the inverted output signal of zero-cross detector 15. Thus, the gating pulses of FIG. 2*d* can be employed to sample the signals of FIGS. 2*b* and 2*c*. More particularly, one of the AND gates 24 or 25 will become opened at the occurrence of a gating pulse depending upon the polarities of the two-level waveforms of FIGS. 2*b* and 2*c* to cause the flip-flop 26 to assume a set or a reset condition.

As a specific example, assume the conditions existing at time $t_1$ in FIG. 2. At this time the output from the zero-cross detector 15 is negative so that the output from inverer 16 is positive, as shown in FIG. 2*c* and is supplied to AND gate 24. Thus, when the pulse 35 of FIG. 2*d* occurs, the flip-flop 26 will be urged to its reset condition. However, since flip-flop 26 is already in its reset condition, no change will occur. However, at time $t_2$ the output of the zero-cross detector 15 is positive, as shown in FIG. 2*b*, and is supplied directly to AND gate 25. Thus, when gating pulse 36 occurs at time $t_2$ the flip-flop 26 will be caused to assume its set condition, as shown in the curve of FIG. 2*e*. Between the time intervals $t_2$ and $t_3$ the output signal of the zero-cross detector 15 assumes its lower level at time $t_d$, and then at time $t_e$ reassumes its higher level. Thus, when the next gating pulse occurs at time $t_3$ there will be no change in the condition of flip-flop 26. However, at time $t_4$ the output of the zero-cross detector 15 will have changed polarities so that the output of inverter 16 is positive, as shown in FIG. 2*c*, thus causing the flip-flop 26 to assume its reset condition upon the occurrence of the gating pulse 38.

The flip-flop 26 has a set output terminal 31 and a reset output terminal 32 which are connected respectively to the set and reset input terminals of flip-flop 29 through AND gates 27 and 28. Thus, whatever condition the flip-flop 26 assumes, the flip-flop 29 will assume the same condition on the next occurring gating pulse. For example, at time $t_2$ the flip-flop 26 assumed its set condition, as shown in FIG. 2*e*. The set output lead 31 of flip-flop 26 thereby supplied a positive (high-level) signal to the AND gate 27 leading to flip-flop 29. Thus, when the next gating pulse 37 occurred at time $t_3$, the flip-flop 29 assumed its set condition. Similarly, at time $t_4$ the flip-flop 26 changed from its set state to its reset condition so that its reset terminal 32 had a high-level signal thereon which was supplied through AND gate 28 to flip-flop 29. At the next gating pulse 39 the flip-flop 29 changed from its set condition to its reset condition.

The exclusive OR circuit 30 has two inputs which are connected to the set output 31 of flip-flop 26 and the set output 33 of flip-flop 29. The function of the exclusive OR gate 30 is logically described as:

$$F=AB+\overline{AB}$$

where A represents the output of the set terminal of flip-flop 26, B represents the output of the set terminal 33 of flip-flop 29, and where the notation $\overline{AB}$ represents the inversion of the signals.

Thus, if the set outputs of both flip-flop circuits 26 and 29 are either at a low level or if both outputs are at a high level, a low level output will be obtained from the exclusive OR circuit 30. However, if the outputs of flip-flops 26 and 29 are not the same, that is, if one is high and one is low, a high output will be produced by the exclusive OR circuit 30, as shown in FIG. 2*g*. The two-level signal of FIG. 2*g* is a two-level binary signal representing the binary information contained in the received single tone data signal.

It will be noted that since the reaction of flip-flop 29 to a change of condition of flip-flop 26 is delayed until one data bit interval after the setting of flip-flop 26, the two-level binary signal is delayed by one data bit with respect to the data contained in the received single tone data signal. A comparison of FIGS. 2*a* and 2*g* illustrates the one bit delay.

Figure 4:
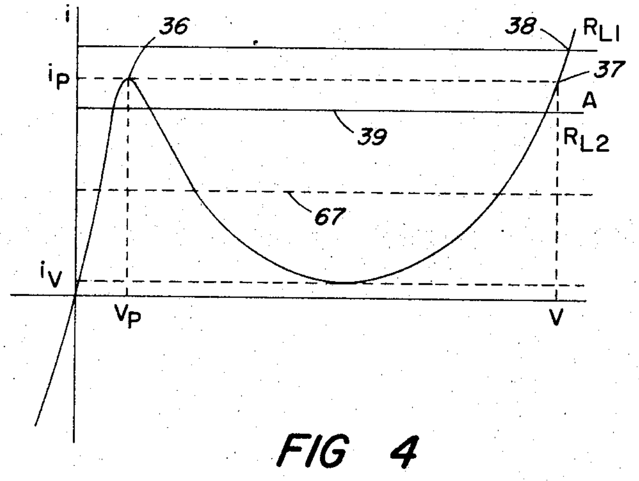
FIG. 4 is a characteristic curve of the zero-cross detector circuit.

Referring now to FIGS. 3 and 4, there is shown the schematic circuit of the zero-cross detector 15 of FIG. 1 and the characteristic curve of a tunnel diode employed in the zero-cross detector. The output of the limiter amplifier 13 of FIG. 1 is supplied to input lead 60 of the diagram of FIG. 3. The heart of the circuit of FIG. 3 is tunnel diode 54, the operation of which can be best described by first referring to the characteristic curves thereof shown in FIG. 4. In FIG. 4, $i_v$ is the valley current, $i_p$ is the peak current, and $V_p$ is the peak point of voltage. The signal voltage $E_s \sin \omega t$ from the limiter amplifier 13 of FIG. 1 and the supply voltage $E_L$, which consists of battery 53 of FIG. 3, are preferably both large compared to the tunnel diode voltage drops. With large valued resistors 50 and 52, the tunnel diode 54 is then driven from two current sources. One of these current sources is a constant D-C current $i_L$ and is derived from the battery source 53. The other current source $i_s$ is supplied to the input lead 60 thereof and is substantially sinusoidal. The total tunnel diode $i_d$ current is then:

$$i_d = I_L + i_s = \frac{E_L}{R_{52}} - \frac{E_s \operatorname{Sin} \omega t}{R_{50}} \quad (1)$$

The net effect of these two currents $i_L$ and $i_s$ is to have the tunnel diode current vary sinusoidally about a direct current level. During the period $0 < wt < \pi$ when the sine wave is negative, the tunnel diode is operating on the portion of the characteristic to the left of the peak point 36. As $\omega t$ approaches $\pi$ the operating point approaches $i_p$. If $i_p$ is reached the diode 54 switches to the point 37 on the characteristic curve of FIG. 4. The instant of switching occurs when $i_d$ equals $i_p$ which may be expressed as follows:

$$\omega t = \text{arc sin } \frac{R_{50}}{E_s}\left(\frac{E_L}{R_{52}} - I_p\right) \quad (2)$$

Expression 2 can be set equal to $\pi$ to give the relationship between the components for the zero crossing time. The result is as follows:

$$\frac{E_L}{R_{52}}(53) = i_p \quad (3)$$

The result of Expression 3 is idealized but is closely approximated in practice. The point $i_d = i_p$ is not a stable point, but since only the switching is important any point reasonably close will give little error. It should be noted that the switching time is independent of $E_s$ and resistor 50, provided that only enough current can be supplied to reach the peak of the curve. If the circuit is required to trigger earlier to compensate for time delay the diode can be biased above the peak point, placing it on the right-hand portion of the curve as indicated at point 38 on the curve. The diode 54 of FIG. 3 will then switch before $\omega t = \pi$ is reached. Firing can be delayed by using a load line that is lower than peak $i_p$, as indicated by load line 39.

It is apparent from the foregoing that the current from battery source 53 in FIG. 3 biases the tunnel diode 54 at or near the peak 36 so that a sinusoidal current applied to the tunnel diode will cause switching very close to the zero crossing of the waveform. Transistor 58 functions as an amplifier to produce on the output lead 61 a potential signal suitable for supplying to the inverter 16 and the AND gate 25 of the circuit of FIG. 1. Positive battery source 55 supplies the collector voltage through resistor 56 for transistor 58. Diode 57 functions to clamp the maximum voltage at the output lead 61 at the positive potential of battery source 56. It is apparent that without the benefit of diode 57 and battery source 56, the collector potential will increase to the voltage of battery source 55 when transistor 58 is in a nonconductive state. Such a nonconductive state occurs when the tunnel diode is operating to the left of point 36 of FIG. 4.

In the circuit of FIG. 3, if the D-C bias is established near the peak 36 of FIG. 4, it is apparent that only those zero crossings wherein the received signal passes from negative to positive will be accurately detected. The zero crossings resulting from a positive to a negative transistion will not be as accurately detected since the input current $i_s$ will have to decrease below the value if $i_v$ before switching can occur from point 37 to point 36. With the particular circuit of FIG. 3, this problem can be solved in one of two ways. The first way is to D-C bias the tunnel diode 54 at a level designated by the dotted line 67 in FIG. 4, which is midway between the peak and the valley of the curve of FIG. 4. With this bias the detection of zero crossings in both directions will have approximately the same accuracy. If a higher degree of accuracy is desired, two zero crossing circuits similar to that of FIG. 3 can be employed, with one of them being adapted to detect only those zero crossings resulting from negative to positive transitions and with the other being adapted to detect only those zero crossings created by positive to negative transitions. The latter type zero crossing can be detected by a circuit similar to that of FIG. 3, but employing an NPN type transistor and reversing the polarities of all the other unilateral elements therein, such as D-C voltage sources 53, 55, and 56, diode 57 and tunnel diode 54. The outputs of the two zero detecting circuits can then be combined to produce the pulse train of FIG. 2*d*.

It is to be understood that the form of the invention shown and described herein is but a preferred embodiment thereof and that various changes may be made in circuit arrangement without departing from the spirit and the scope of the invention.

I claim:

1. In a communication system employing a time synchronous data carrying signal in which a half cycle of a signal of frequency $f_1$ represents a binary "0," in which a full cycle of a signal of frequency $2f_1$ represents a binary "1," in which the peak amplitudes of said half and full cycles are equal, and in which the transition from any given data bit to the next data bit always occurs at the peak amplitudes of the half and full cycles, demodulator means comprising:

zero cross detector means for detecting the zero crossings of said data carrying signal to produce a two-level signal with a first level occurring when said data carrying signal crosses zero in one direction and the second level occurring when the data carrying signal crosses zero in the opposite direction, binary signal extracting means including synchronized sampling pulse generating means for detecting polarity changes of said two-level signal between successive bit transition periods and for reproducing the data of said received data carrying signal in binary signal form, said binary signal extracting means constructed to generate said binary signal having a first signal level representing one type binary bit if a polarity change is detected and to generate a second signal level representing the other type binary bit if no polarity change is detected.

2. Demodulator means in accordance with claim 1 which said binary extracting means comprises:

first bistable means having set and reset output terminals and second bistable means having set and reset input terminals with the output signals on said set and reset output terminals of said first bistable means being supplied to the set and reset input terminals of said second bistable means, said first and second bistable means being triggered to change states in accordance with the levels of the signals supplied to the input terminals thereof at the occurrence of said synchronized sampling pulse generating means, and exclusive "OR" gating means responsive to the output signals of said first and second bistable means to produce said two-level binary signal containing the data of said received data carrying signal.

3. Demodulator means in accordance with claim 2 comprising:

means for inverting the output signal of said zero cross detector means, in which said first bistable means comprises:

first flip-flop means having set and reset input, and first and second AND gating means responsive to the synchronizing pulses and the inverted and noninverted output signal of said zero cross detector means to assume one of its two possible states in accordance with the polarity of the output signal of said zero cross detector means, the set and reset output terminals of said first bistable means comprising the set and reset output terminals of said first flip-flop means;

and in which said second bistable device comprises:

second flip-flop means having set and reset inputs;

and third and fourth AND gates having their outputs connected, respectively, to the set and reset inputs of said second flip-flop means and responsive to the output signals appearing on the set and reset output terminals of said first flip-flop means to cause said second flip-flop means to assume one of its two possible states in accordance with the polarities of the output signals of said first flip-flop means.

4. In a communication system employing a time synchronous data carrying signal in which a half cycle of a signal of frequency $f_1$ represents a binary "0," in which a full cycle of a signal of frequency $2f_1$ represents a binary "1," in which the peak amplitudes of said half and full cycles are equal, and in which the transition from any given data bit to the next data bit always occurs at the peak amplitudes of the half and full cycles, demodulator means comprising:

zero cross detector means for detecting the zero crossings of said data carrying signal to produce a first two-level signal with a first level occurring when said data carrying signal crosses zero in one direction and the second level occurring when the data carrying signal crosses zero in the opposite direction, synchronizing signal means for generating synchronizing pulses which are synchronized with respect to the data bit transition times, first bistable means comprising set and reset output terminals and constructed to respond to the simultaneous output of said zero cross detector means and said synchronizing pulses to produce oppositely phased second and third two-level signals on its set and reset output terminals with the levels changing with each level change of the first two-level output signal of the zero cross detecting circuit, said level changes of the bistable means output signal occurring at said synchronizing pulses, second bistable means comprising set and reset input terminals and an output terminal and constructed to respond to the set and reset output signals of said first bistable means and said synchronizing pulses to produce a fourth two-level output signal identical to one of the two level output signals of said first bistable means but delayed one data bit period, and exclusive "OR" gating circuit means responsive to the output signal of said second bistable means and the output signal of the corresponding state of said first bistable means to reproduce the data contained in said received data carryinig signal in a two-level signal form with one level representing binary "0's" and the other level representing binary "1's."

5. Demodulator means in accordance with claim 4 comprising:

means for inverting the output signal of said zero cross detector means, in which said first bistable means comprises:

first flip-flop means having set and reset inputs, and first and second AND gating means responsive to the synchronizing pulses and the inverted and noninverted output signal of said zero cross detector means to assume one of its two possible states in accordance with the polarity of the output signal of said zero cross detector means, the set and reset output terminals of said first bistable means comprising the set and reset output terminals of said first flip-flop means, and in which said second bistable device comprises:

second flip-flop means having set and reset inputs;

and third and fourth AND gates having their outputs connected, respectively, to the set and reset inputs of said second flip-flop means and responsive to the output signals appearing on the set and reset output terminals of said first flip-flop means to cause said second flip-flop means to assume one of its two possible states in accordance with the polarities of the output signals of said first flip-flop means.

References Cited

UNITED STATES PATENTS

| | | | |
|---|---|---|---|
| 3,121,197 | 2/1964 | Irland | 325—30 |
| 3,234,400 | 2/1966 | Hart | 307—88.5 |
| 3,238,299 | 3/1966 | Lender | 178—68 |
| 3,258,696 | 6/1966 | Heymann | 307—88.5 X |
| 3,377,560 | 4/1968 | Renshaw | 325—320 |

ROBERT L. GRIFFIN, *Primary Examiner.*

W. S. FROMMER, *Assistant Examiner.*